US012637990B1

(12) United States Patent
Kiwan et al.

(10) Patent No.: US 12,637,990 B1
(45) Date of Patent: May 26, 2026

(54) METHODS AND SYSTEMS FOR MODULATING ENGINE AIR-FUEL RATIO DURING CYLINDER IMBALANCE DIAGNOSTIC

(71) Applicant: Ford Global Technologies, LLC, Dearborn, MI (US)

(72) Inventors: Rani Kiwan, West Bloomfield, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 18/959,182

(22) Filed: Nov. 25, 2024

(51) Int. Cl.
*F02D 41/26* (2006.01)
*F02D 41/00* (2006.01)

(52) U.S. Cl.
CPC ........... *F02D 41/26* (2013.01); *F02D 41/008* (2013.01)

(58) Field of Classification Search
CPC ........... F02D 41/0087; F02D 2041/001; F02D 41/008; F02D 41/0085; F02D 2250/28; F02D 41/123; F02D 41/40; F02D 41/26; F02D 41/1486; F02D 41/1498; F02D 41/22; F02D 41/30; F02D 41/1495; F02D 41/1475; F02D 19/081; F02D 41/2454
USPC ........ 123/179.16, 406.47, 704; 701/103, 111
See application file for complete search history.

(56) References Cited

U.S. PATENT DOCUMENTS

| | | | | | |
|---|---|---|---|---|---|
| 5,758,493 | A * | 6/1998 | Asik | F01N 3/0842 60/297 |
| 8,401,764 | B2 | 3/2013 | Jentz et al. | |
| 8,965,665 | B2 * | 2/2015 | Iwazaki | F02D 41/008 123/690 |
| 10,968,853 | B2 | 4/2021 | Surnilla et al. | |
| 11,965,472 | B1 | 4/2024 | Kiwan et al. | |
| 2013/0199466 | A1 * | 8/2013 | Friedfeldt | F02B 75/20 123/90.1 |
| 2013/0268177 | A1 * | 10/2013 | Wu | F02D 41/1458 73/114.72 |
| 2015/0052890 | A1 * | 2/2015 | Shinoda | F01N 3/2892 60/603 |
| 2017/0122227 | A1 | 5/2017 | Rollinger et al. | |
| 2018/0313287 | A1 * | 11/2018 | Shogenji | F02P 5/152 |
| 2021/0071608 | A1 * | 3/2021 | Martin | F02D 41/1475 |
| 2021/0310435 | A1 * | 10/2021 | Thomas | F02D 41/04 |

FOREIGN PATENT DOCUMENTS

| | | | | |
|---|---|---|---|---|
| CN | 106640392 A | 5/2017 | |
| CN | 112443413 A * | 3/2021 | F02D 41/008 |
| DE | 102004058942 A1 * | 9/2005 | F02P 5/1504 |
| DE | 102017113119 A1 | 12/2017 | |
| JP | H09133037 A * | 5/1997 | |
| JP | 2005133714 A * | 5/2005 | F02D 41/2454 |
| JP | 2007056682 A * | 3/2007 | F02D 41/1498 |

(Continued)

*Primary Examiner* — George C Jin
*Assistant Examiner* — Teuta B Holbrook
(74) *Attorney, Agent, or Firm* — McCoy Russell LLP

(57) ABSTRACT

Systems and methods for supplying air to fuel ratio patterns to an engine are disclosed. In one example, the air to fuel patterns may be configured to evaluate cylinders for imbalance that are at least one hundred and eighty crankshaft degrees apart according to a combustion order of the engine so that interference between cylinders being evaluated for imbalance may be reduced.

14 Claims, 11 Drawing Sheets

(56) References Cited

FOREIGN PATENT DOCUMENTS

| | | | | | |
|---|---|---|---|---|---|
| JP | 2009156100 A | * | 7/2009 | ......... | F02D 41/0295 |
| JP | 2011144754 A | * | 7/2011 | | |
| JP | 2018136215 A | * | 8/2018 | ............. | G06F 30/23 |
| JP | 2023139445 A | * | 10/2023 | | |

* cited by examiner

METHODS AND SYSTEMS FOR MODULATING ENGINE AIR-FUEL RATIO DURING CYLINDER IMBALANCE DIAGNOSTIC

FIELD

The present description relates to a system and methods for modulating engine air-fuel ratio during an engine cylinder imbalance diagnostic.

BACKGROUND

An internal combustion engine may include a plurality of cylinders. The plurality of engine cylinders may be split between a first cylinder bank and a second cylinder bank in a V-type engine. The engine's cylinders may fire (e.g., initiate combustion in cylinders) in an order that tends to reduce torque variation over an engine cycle (e.g., two crankshaft revolutions for a four-stroke engine). Further, air, fuel, and spark may be introduced to an engine cylinder so that torque generated by the cylinder is substantially equal to torque that is generated by the engine's other cylinders generated in an engine cycle. Fuel injector and airflow variability, and cylinder valve deposit formation, may affect torque variability. Estimating an amount of torque that is generated by a cylinder may be used to compensate for such variability.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
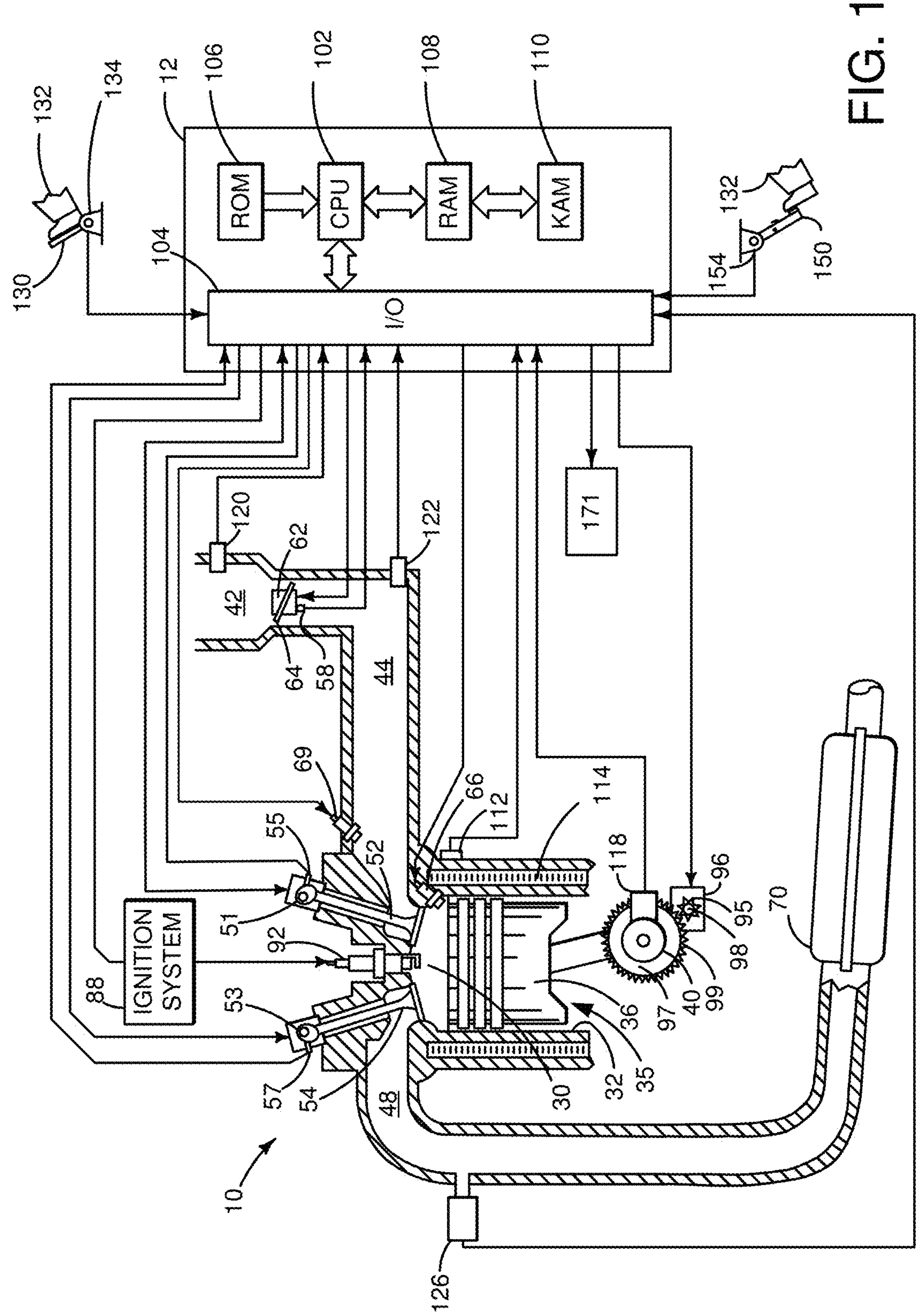
FIG. 1 is a schematic diagram of a single cylinder of an engine.
Figure 9:
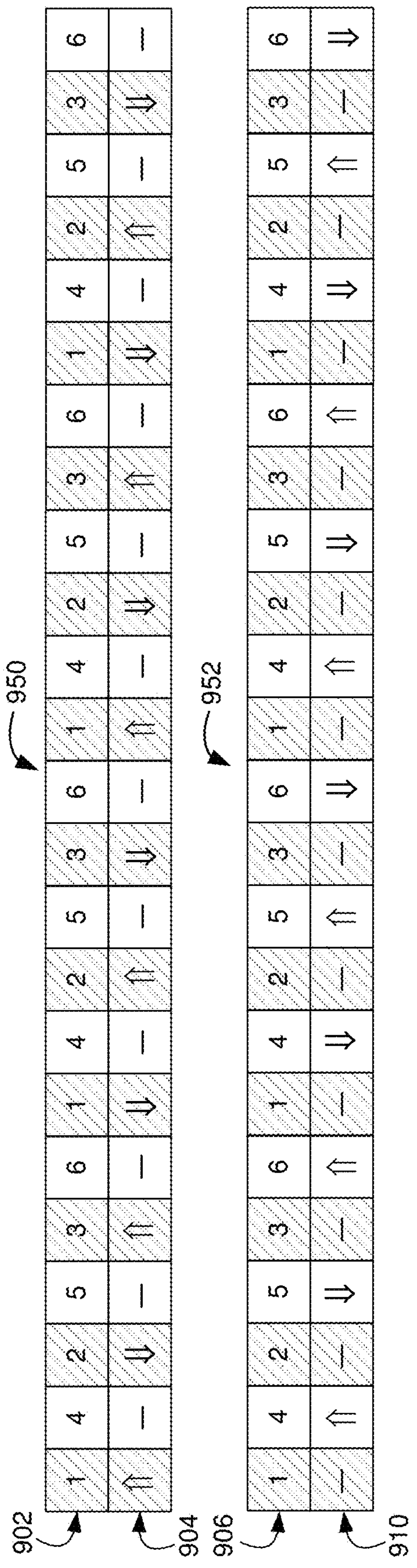
Figure 10:
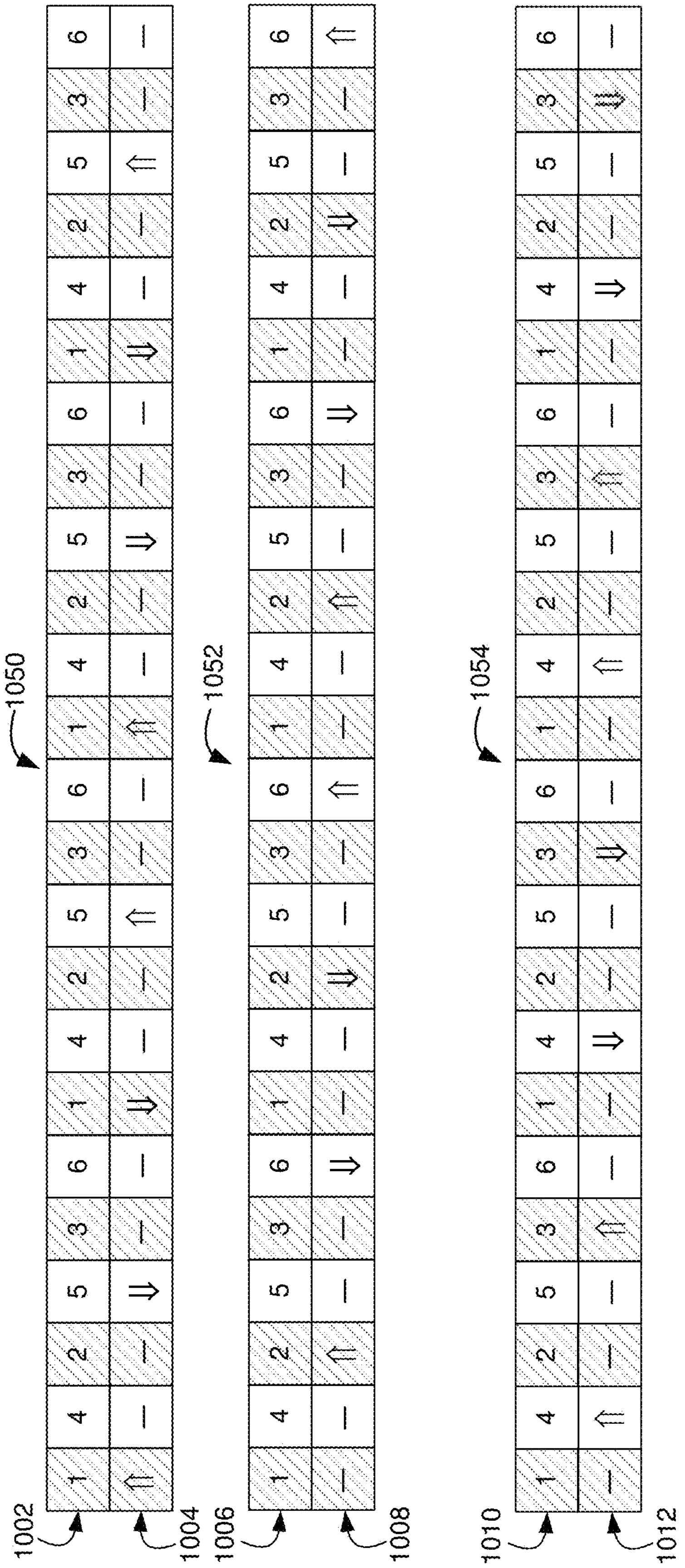
Figure 11:
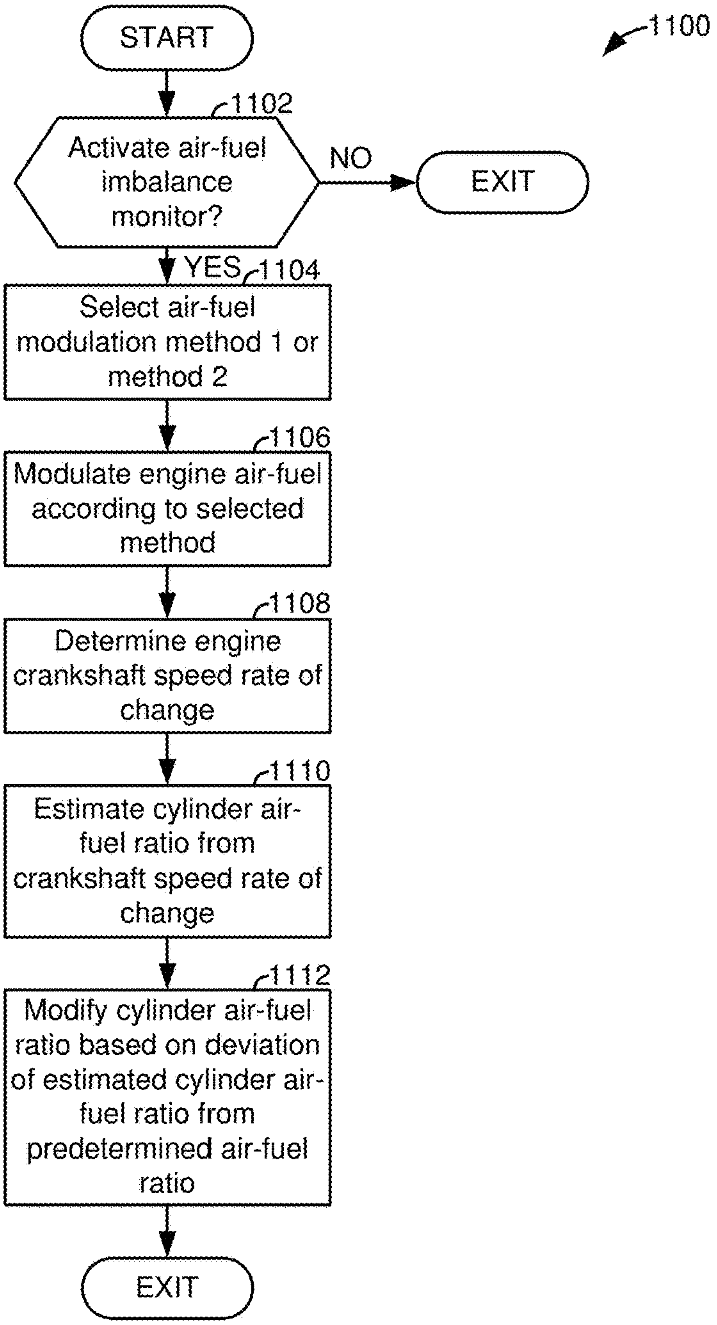
FIG. 11 shows a flowchart of an example method for operating an engine.

The present description is related to generating an engine air-fuel ratio sequence that may reduce interference by other cylinders of an engine when generating an inferred air-fuel ratio of a cylinder of the engine. By reducing the interference that may be caused by air-fuel ratios of cylinders that are adjacent in an engine firing order to a cylinder that is being evaluated, air-fuel ratio estimates for the cylinder that is being evaluated may be closer to the actual air-fuel ratio of the cylinder that is being evaluated. The engine may be an internal combustion engine that includes eight cylinders, an example of which is shown in FIG. 1. The engine may be operated with air-fuel ratios as shown in FIGS. 3-8. The air-fuel ratio sequence may be extended to six cylinder engines as shown in FIGS. 9-10. A method for operating an engine with one of the described air-fuel ratio sequences is shown in FIG. 11.

Component aging and manufacturing variation between components may lead to variation in air-fuel ratios between cylinders of an internal combustion engine. Variation between air-fuel ratios of engine cylinders may lead to increased vehicle emissions. As such, administrative agencies may mandate air-fuel ratio imbalance monitoring. The cylinder imbalance monitoring may determine differences between a commanded engine cylinder air-fuel ratio and an estimated engine cylinder air-fuel ratio when the engine cylinder is commanded to combust air and fuel mixtures at a fixed air-fuel ratio.

The inventors herein have recognized that air-fuel ratios of cylinders that are adjacent according to a firing order of an engine to a cylinder that is being evaluated for an air-fuel ratio imbalance may influence air-fuel ratio estimates for the cylinder that is being evaluated for the cylinder imbalance. This recognition has lead the inventors to developed a method for operating an engine, comprising: operating the engine over a plurality of engine cycles in response to an engine cylinder imbalance diagnostic request such that during each engine cycle a pair of cylinders is operated with a first cylinder combusting a first ratio of air to fuel and a second cylinder combusting a second ratio of air to fuel, where cylinders other than the first cylinder and the second cylinder are combusting a ratio of air to fuel that is different from the first ratio of air to fuel and the second ratio of air to fuel, where cylinders included in the pair of cylinders vary over the plurality of engine cycles, where each cylinder of the engine is included in the pair of cylinders over the plurality of engine cycles, and where there is at least one hundred and eighty crankshaft degrees between combusting the first ratio of air to fuel and the second ratio of air to fuel during each of the plurality of engine cycles.

By operating an engine such that cylinders being evaluated for imbalance (e.g., a cylinder's air-fuel ratio that departs from a requested air-fuel ratio and that may result in an unexpected change in engine torque) are separated by at least one hundred and eighty crankshaft angle degrees, it may be possible to reduce interference generated by other cylinders on a cylinder that is being evaluated for imbalance. The at least one hundred and eighty crankshaft angle degrees ensure that there is no overlap in power strokes of the cylinders that are being evaluated for imbalance. Consequently, this approach may be especially useful for evaluating imbalance between cylinders of a V-eight engine where there are ninety crankshaft degrees between initiating combustion in cylinders that are adjacent according to a combustion or firing order of the engine.

The present description may provide several advantages. In particular, the approach may provide increased cylinder air-fuel ratio accuracy and torque estimate accuracy. Further, the approach may reduce engine emissions when a cylinder diagnostic is being performed. Additionally, the approach may be applied to a variety of different engine designs and configurations.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via an energy transfer device (e.g., a chain). In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust poppet valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 35, which is known to those skilled in the art as direct injection. Direct fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown). Alternatively, or in addition, engine 10 may also include a port fuel injector 69 for each cylinder, which is known to those skilled in the art as port fuel injection. Port fuel injector 69 delivers liquid fuel in proportion to a voltage pulse width or fuel injector pulse width of a signal from controller 12. Fuel may be supplied to port fuel injector 69 via the fuel system (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a distance displaced by human 132; a position sensor 154 coupled to caliper control pedal 150 for sensing distance displaced by human 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

In some examples, the engine may be coupled to an electric motor/battery system in a hybrid vehicle. Further, controller 12 may receive input and communicate conditions such as degradation of components to illuminate a light, or alternatively, to human/machine interface 171 (touch screen display and input device).

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
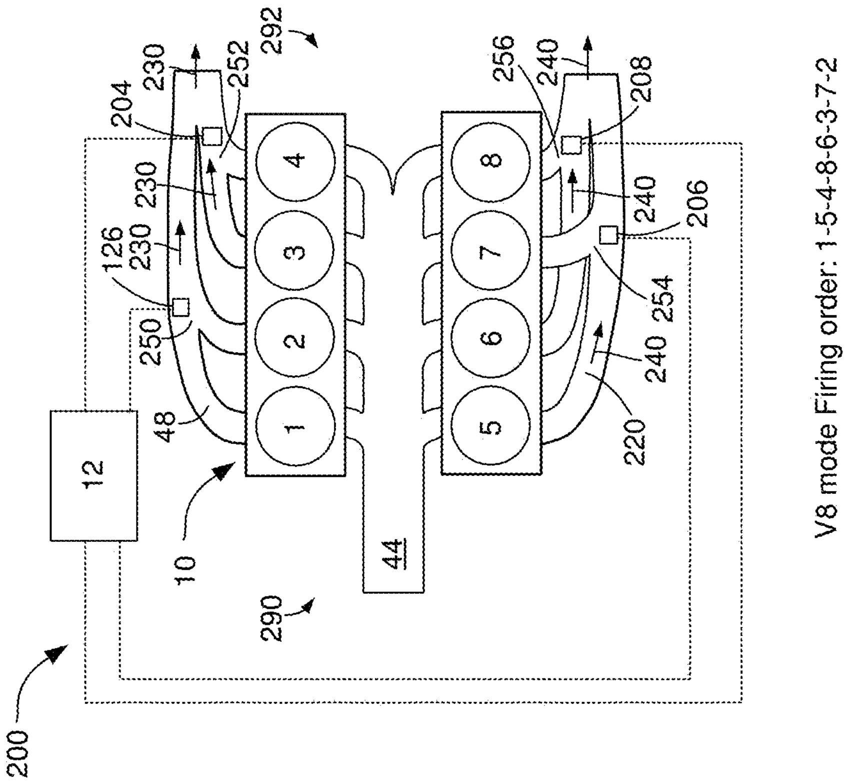
FIG. 2 is a schematic diagram of an example eight-cylinder engine.

Referring now to FIG. 2, a plan view 200 of engine 10 is shown. Engine 10 is the same engine as shown in FIG. 1, but in FIG. 2, all engine cylinders are shown. In this example, the engine's cylinders are numbered 1 through 8. The cylinders are supplied with air via intake manifold 44. A first bank of cylinders includes cylinders 1-4 and a second bank of cylinders includes cylinders 5-8. Cylinders 1-4 are shown in fluidic communication with exhaust manifold 48 and cylinders 5-8 are shown in fluidic communication with exhaust manifold 220. Each of cylinders 1-8 includes fuel injectors, spark plug, and intake/exhaust valves as shown in FIG. 1. Front 290 and rear 292 of engine 10 are as indicated.

A first oxygen sensor 126 is shown configured to sense exhaust gases from cylinders numbered 1 and 2 at exhaust gas confluence location 250 for cylinder numbers 1 and 2. A second oxygen sensor 204 is shown configured to sense exhaust gases from cylinders 3 and 4 at exhaust gas confluence location 252 for cylinder numbers 3 and 4. A third oxygen sensor 206 is shown configured to sense exhaust gases from cylinders numbered 5 and 7 at exhaust gas confluence location 254 for cylinder numbers 5 and 7. A fourth oxygen sensor 208 is shown configured to sense exhaust gases from cylinders 6 and 8 at exhaust gas confluence location 256 for cylinder numbers 6 and 8. There are no cylinders that are downstream of any of the exhaust gas sensors according to exhaust flow from the cylinders as indicated by arrows 230 and 240.

Output of first oxygen sensor 126 may be applied as fuel-air ratio feedback for controlling fuel that is supplied to cylinders numbered 1 and 2 via port and/or direct fuel injectors. Output of second oxygen sensor 204 may be applied as fuel-air ratio feedback for controlling fuel that is supplied to cylinders numbered 3 and 4 via port and/or direct fuel injectors. Output of third oxygen sensor 206 may be applied as fuel-air ratio feedback for controlling fuel that is supplied to cylinders numbered 5 and 7 via port and/or direct fuel injectors. Output of fourth oxygen sensor 208 may be applied as fuel-air ratio feedback for controlling fuel that is supplied to cylinders numbered 6 and 8 via port and/or direct fuel injectors. Thus, first oxygen sensor 126 is associated with cylinders numbered 1 and 2, second oxygen sensor 204 is associated with cylinders numbered 3 and 4, third oxygen sensor 206 is associated with cylinders numbered 5 and 7, and fourth oxygen sensor 208 is associated with cylinders numbered 6 and 8.

Figure 3:
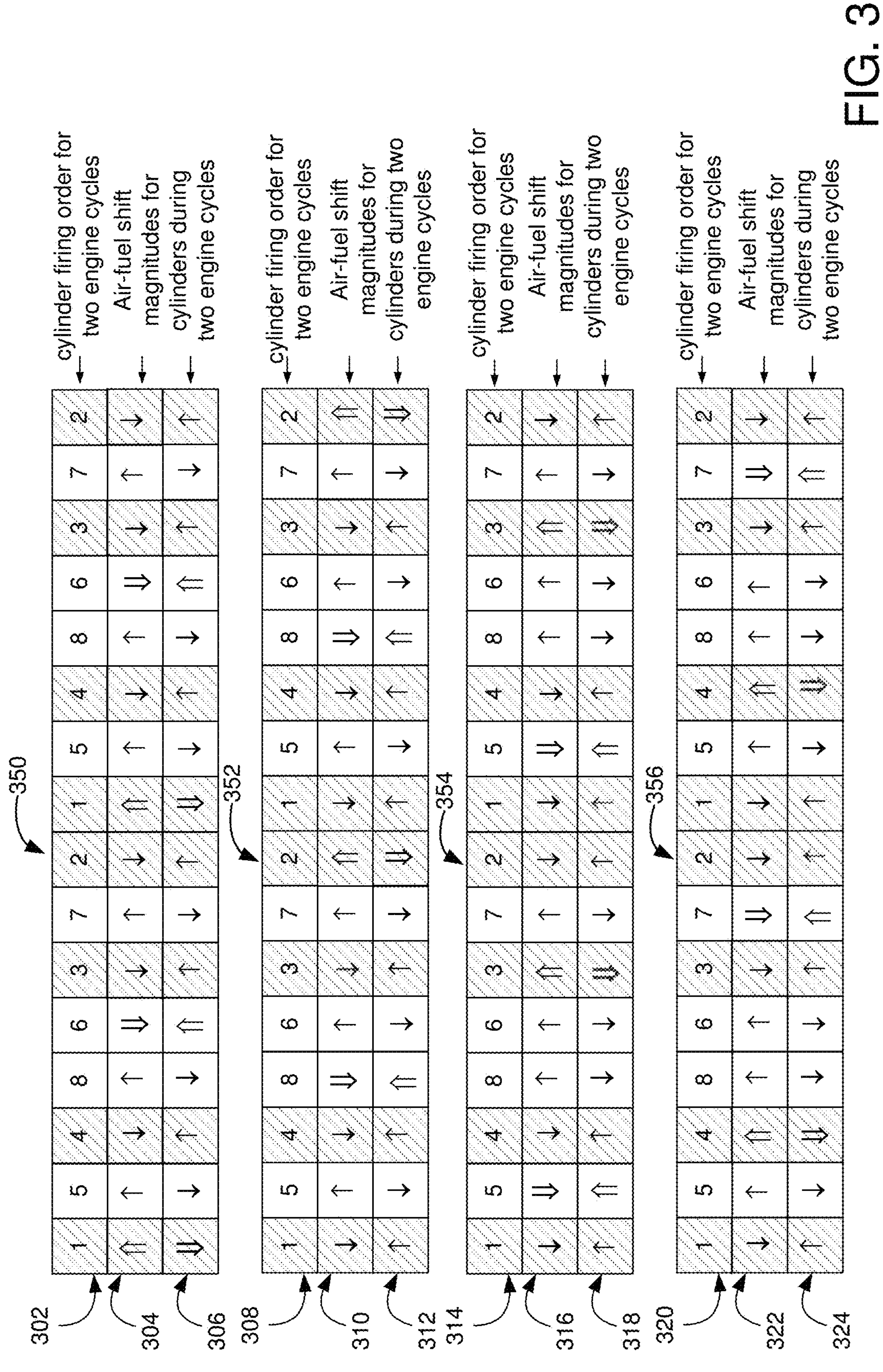
FIGS. 3-10 show tables describing example air-fuel ratio modulation sequences for cylinders of an engine.

Referring now to FIG. 3, example tables showing different versions of a first approach to modulate air to fuel ratios of engine cylinders during cycles of a V-eight four-stroke engine are shown. The different types of arrows that are shown in FIG. 3 and in FIGS. 4-10 are a shown to indicate the magnitude and direction of air to fuel mixtures that are adjusted or shifted from a stoichiometric air to fuel mixture during a cylinder imbalance diagnostic. Therefore, for the sake of brevity, the description of the arrows and table formats will not be repeated for each figure. Additionally, it may be appreciated that the air-fuel ratios described herein are relative to a stoichiometric air-fuel ratio of 14.6:1, and air-fuel ratios for fuels having different stoichiometric ratios may be adjusted accordingly.

Wide shaft arrows (e.g., ⇑ and ⇓ indicate that the cylinder that the wide shaft arrow is associated with is being evaluated for imbalance by applying a larger richer or leaner adjustment from stoichiometry to the cylinder's air to fuel ratio. For example, if cylinder number one is being evaluated for imbalance, cylinder number one's air to fuel ratio may be adjusted from 14.6:1 (e.g., stoichiometric) to 16.6:1 when arrow ⇑ is associated with cylinder number one. On the other hand, if cylinder number one is being evaluated for imbalance, cylinder number one's air to fuel ratio may be adjusted from 14.6:1 (e.g., stoichiometric) to 12.6:1 when arrow ⇓ is associated with cylinder number one. Thus, an up arrow indicates a lean adjustment to the cylinder's air to fuel ratio, whereas a down arrow indicates a rich adjustment to the cylinder's air to fuel ratio. The air to fuel ratio adjustment for a cylinder is performed via adjusting the fuel amount that is supplied to the cylinder that is being evaluated for imbalance. The engine air flow may not be adjusted in response to the cylinder imbalance diagnostic request.

Narrow shaft arrows (e.g., ↑ and ↓) indicate that the cylinder this type of arrow is associated with is not being evaluated for imbalance. Rather, these arrows indicate that the air to fuel ratio of the cylinder associated with this arrow is being adjusted so that over one or two engine cycles, the overall engine cylinder bank combustion, or overall engine combustion, during one or two engine cycles generates a substantially stoichiometric air to fuel ratio (e.g., within 2% of a stoichiometric air to fuel ratio). In other words, even during the imbalance diagnostic, it may be desirable for the engine to combust, on average over one or two engine cycles, a stoichiometric air to fuel ratio so that the engine's catalyst functions as intended. Therefore, a larger perturbing of a cylinder's air to fuel ratio to detect a presence or absence of cylinder imbalance may be compensated by a smaller perturbing of other cylinders in an opposite direction. For example, for a V-six engine with two cylinder banks, one cylinder bank including cylinder numbers 1-3, the air-fuel ratio of cylinder number one may be adjusted to 0.9 Lambda (Lambda=air-fuel ratio/stoichiometric air-fuel ratio) during an engine cycle to evaluate imbalance in cylinder number one, while during the same engine cycle the air-fuel ratios of cylinders numbered two and three may be adjusted to 1.05 Lambda so that over an engine cycle the cylinder bank that includes cylinders 1-3 combusts an average air to fuel ratio of 1.0 Lambda (a stoichiometric air to fuel ratio). Thus, if cylinder number one of an engine is being evaluated for imbalance, cylinder number one's air to fuel ratio may be adjusted from 14.6:1 (e.g., a stoichiometric air-fuel ratio) to 16.6:1 when arrow ⇑ is associated with cylinder number one. On the other hand, if cylinder number one is being evaluated for imbalance, cylinder number one's air to fuel ratio may be adjusted from 14.6:1 (stoichiometric) to 12.6:1 when arrow ⇓ is associated with cylinder number one. Thus, an up arrow indicates a lean adjustment to the cylinder's air to fuel ratio away from a stoichiometric air to fuel ratio, whereas a down arrow indicates a rich adjustment to the cylinder's air to fuel ratio away from a stoichiometric air to fuel ratio. The same convention applies for narrow shaft arrows associated with cylinders that are not being evaluated during the current engine cycle. Narrow shaft arrows indicate smaller lean or rich air-fuel ratio adjustments as compared to wide shaft arrows.

FIG. 3 includes four tables 350-356. These tables indicate cylinders according to the firing or combustion order of the engine, a V-eight in this example. Further, cylinders associated with a first cylinder bank (e.g., cylinders 1-4) include a cross-hatched background and cylinders associated with a second cylinder bank (e.g., cylinders 5-8) include an open or non-cross-hatched background. In this example, tables 350-356 show air to fuel ratio adjustments for two engine cycles as indicated by the engine firing order 1-5-4-8-6-3-7-2 being repeated in rows 302, 308, 314, and 320. Zeroth rows 302, 308, 314, and 320 indicate firing order of the engine. The air to fuel ratio adjustments or shifts are shown in the first and second rows of each table (304, 306, 310, 312, 316, 318, 322, and 324). The first row of each table represents a fuel adjustment sequence for evaluating a pair of engine cylinders for imbalance. The second row of each table shows a sequence that is opposite or inverse of the fuel adjustments that are provided in the first row of each table.

The air-fuel ratio adjustment sequence in the first row of each table may be performed when it may be desirable to perturb the air-fuel ratio of a first cylinder being evaluated for imbalance via a lean air-fuel ratio adjustment and when it may be desirable to perturb the air-fuel ratio of a second cylinder being evaluated for imbalance via a rich air-fuel ratio adjustment. Conversely, the air-fuel ratio adjustment sequence in the second row of each table may be performed when it may be desirable to perturb the air-fuel ratio of the first cylinder being evaluated for imbalance via a rich air-fuel ratio adjustment and when it may be desirable to perturb the air-fuel ratio of the second cylinder being evaluated for imbalance via a lean air-fuel ratio.

Since the tables shown in FIG. 3 are associated with a V-eight engine, there are ninety crankshaft degrees between each fueling adjustment shown between cylinder firings. The air-fuel ratio control sequence shown in the first row 304 of table 350 includes perturbing the air-fuel ratio of cylinder number one so that cylinder number one may be evaluated for imbalance such that a larger amount of fuel is removed from a stoichiometric air-fuel ratio for cylinder number one, thereby operating cylinder number one with a leaner air-fuel mixture (e.g., 16.6:1 air-fuel ratio). Since cylinder number one is included in a first bank of cylinders and it is desired to operate the first bank of cylinders with an overall stoichiometric air-fuel ratio, other cylinders in cylinder bank one (e.g., 2-4) are operated with a slightly rich mixture as indicated by the down arrows (↓). Thus, cylinders numbered 2-4 tend to move the overall air-fuel ratio of the first bank of cylinders back toward the stoichiometric air to fuel ratio after cylinder number one has been operated with the leaner air to fuel ratio.

The first row 304 of table 350 also indicates that cylinder number six is to be operated with a richer air to fuel ratio (e.g., 12.6:1) when the air-fuel adjustment sequence of the first row 304 of table 350 is performed when evaluating imbalance in cylinder numbers one and six. In particular, the air-fuel ratio control sequence shown in the first row 304 of table 350 includes perturbing the air-fuel ratio of cylinder number six so that cylinder number six may be evaluated for imbalance such that a larger amount of fuel is added to a stoichiometric air-fuel ratio for cylinder number six, thereby operating cylinder number six with a richer air-fuel mixture (e.g., 12.6:1 air-fuel ratio). Since cylinder number six is included in a second bank of cylinders and it is desired to operate the second bank of cylinders with an overall stoichiometric air-fuel ratio, other cylinders in cylinder bank two (e.g., 5, 7, and 8) are operated with a slightly lean mixture as indicated by the down arrows (↑). As such, cylinders numbered 5, 7, and 8 tend to move the overall air-fuel ratio of the second bank of cylinders back toward the stoichiometric air to fuel ratio after cylinder number six has been operated with the richer air to fuel ratio.

The second row 306 of table 350 is similar to the first row 304 of table 350, but the air-fuel ratios are adjusted in an inverse pattern as compared to the adjustment shown in the first row 304 of table 350. For example, the air-fuel ratio control sequence shown in the second row 306 of table 350 includes perturbing the air-fuel ratio of cylinder number one so that cylinder number one may be evaluated for imbalance such that a larger amount of fuel added to a stoichiometric air-fuel ratio for cylinder number one, thereby operating cylinder number one with a richer air-fuel mixture (e.g., 12.6:1 air-fuel ratio). Additionally, other cylinders in cylinder bank one (e.g., 2-4) are operated with a slightly lean mixture as indicated by the up arrows (↑). Thus, cylinders numbered 2-4 tend to move the overall air-fuel ratio of the first bank of cylinders back toward the stoichiometric air to fuel ratio after cylinder number one has been operated with the richer air to fuel ratio. The second row 306 also shows cylinder number six is to be operated with a leaner air to fuel ratio (e.g., 16.6:1) when the air-fuel adjustment sequence of the second row 306 of table 350 is performed. Further, other cylinders in cylinder bank two (e.g., five, seven, and eight) are operated with a slightly rich mixture as indicated by the down arrows (↓). As such, cylinders numbered five, seven, and eight tend to move the overall air-fuel ratio of the second bank of cylinders back toward the stoichiometric air to fuel ratio after cylinder number six has been operated with the leaner air to fuel ratio.

The second table from the top of FIG. 3 (352) shows air-fuel control sequences when evaluating cylinder numbers two and eight for imbalance. The sequence of table 352 may be executed before or after the sequences of tables 350, 354, and 356 are executed to diagnose the presence or absence of imbalance in cylinders numbered one, six, three, five, four, and seven. In first row 310 of table 352, cylinder number two is operated with a leaner mixture (e.g., 16.6:1) and cylinder number eight is operated with a richer mixture (e.g., 12.6:1). Cylinders one, three, and four are operated with slightly richer mixtures (e.g., 13.93:1) and cylinders five, six, and seven may are operated with slightly leaner mixtures (e.g., 15.27:1) so that the overall engine air to fuel ratio over an engine cycle is stoichiometric. Row two 312 of table 352 shows an inverse air to fuel control sequence as compared to row one 310 of table 352.

The third table from the top of FIG. 3 (354) shows air-fuel control sequences when evaluating cylinder numbers five and three for imbalance. The sequence of table 354 may be executed before or after the sequences of tables 350, 352, and 356 are executed to diagnose the presence or absence of imbalance in cylinders numbered one, two, six, four, seven, and eight. In first row 316 of table 354, cylinder number three is operated with a leaner mixture (e.g., 16.6:1) and cylinder number five is operated with a richer mixture (e.g., 12.6:1). Cylinders one, two, and four are operated with slightly richer mixtures (e.g., 13.93:1) and cylinders six, seven, and eight may are operated with slightly leaner mixtures (e.g., 15.27:1) so that the overall engine air to fuel ratio over an engine cycle is stoichiometric. Row two 318 of table 354 shows an inverse air to fuel control sequence as compared to row one 316 of table 354.

The fourth table from the top of FIG. 3 (356) shows air-fuel control sequences when evaluating cylinder numbers four and seven for imbalance. The sequence of table 356 may be executed before or after the sequences of tables 350, 352, and 354 are executed to diagnose the presence or absence of imbalance in cylinders numbered one, two, three, five, six, and eight. In first row 322 of table 356, cylinder number four is operated with a leaner mixture (e.g., 16.6:1) and cylinder number seven is operated with a richer mixture (e.g., 12.6:1). Cylinders one, two, and three are operated with slightly richer mixtures (e.g., 13.93:1) and cylinders five, six, and eight may are operated with slightly leaner mixtures (e.g., 15.27:1) so that the overall engine air to fuel ratio over an engine cycle is stoichiometric. Row two 324 of table 356 shows an inverse air to fuel control sequence as compared to row one 322 of table 356.

The sequences of FIG. 3 provide for the engine operating with an overall stoichiometric air to fuel ratio over each engine cycle (e.g., two revolutions for a four-stroke engine). Further, the sequences of FIG. 3 provide air-fuel ratio patterns of ↓⇑↑ for when cylinders one and six are being evaluated for imbalance, where ⇑ indicates air-fuel ratio adjustment from stoichiometry for the cylinder being evaluated for imbalance, where ↓ indicates air-fuel adjustment from stoichiometry for the cylinder that immediately precedes the cylinder being evaluated for imbalance according to the firing order of the engine, and where ↑ indicates the air-fuel adjustment from stoichiometry for the cylinder that immediately follows the cylinder being evaluated for imbalance according to the firing order of the engine. The sequence of FIG. 3 also provides air-fuel ratio patterns of ↑⇑↓ for when cylinders two and eight are being evaluated for imbalance and ↑⇑↑ for when cylinders three, four, five, and seven are being evaluated for imbalance. Additionally, the inverse of these air-fuel ratio patterns may be applied for evaluating imbalance and these air-fuel ratio patterns do not include where large air-fuel ratio adjustments are supplied to cylinders that are adjacent in the engine's firing order (e.g., no ↑⇓⇑).

Figure 4:
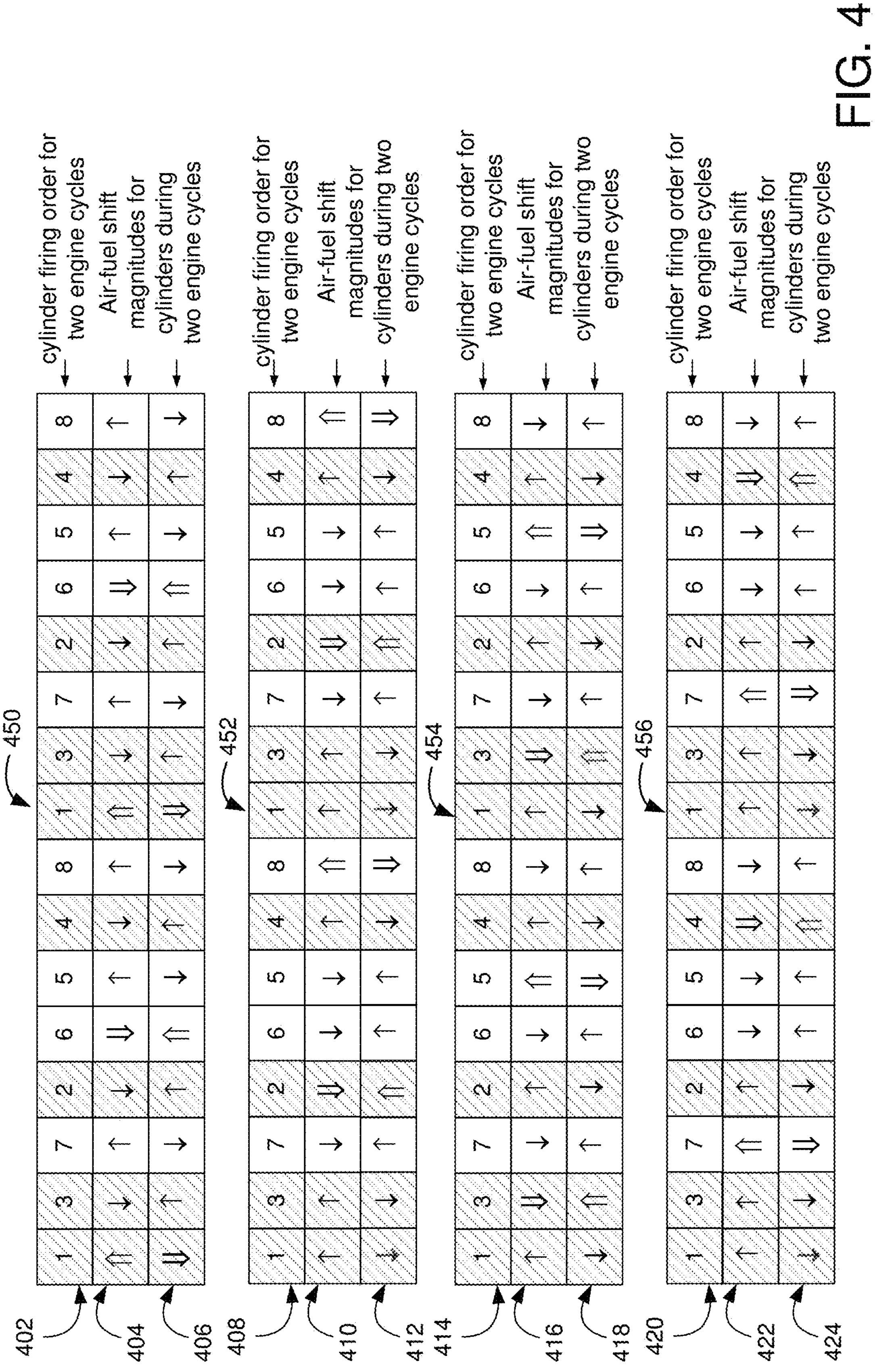

Referring now to FIG. 4, example tables showing a different version of the first approach to modulate air to fuel ratios of engine cylinders during cycles of a second V-eight four-stroke engine are shown. The second V-eight has a different firing order than the first V-eight that is shown in FIG. 3.

FIG. 4 includes four tables 450-456. These tables indicate cylinders according to the firing or combustion order of the engine, a V-eight with a firing order of 1-3-7-2-6-5-4-8 in this example. Further, cylinders associated with a first cylinder bank (e.g., cylinders 1-4) include a cross-hatched background and cylinders associated with a second cylinder bank (e.g., cylinders 5-8) include an open or non-cross-hatched background. Tables 450-456 show air to fuel ratio adjustments for two engine cycles. Zeroth rows 402, 408, 414, and 420 indicate firing order of the engine. The air to fuel ratio adjustments or shifts are shown in the first and second rows of each table (404, 406, 410, 412, 416, 418, 422, and 424). The first row of each table represents a fuel adjustment sequence for evaluating a pair of engine cylinders for imbalance. The second row of each table shows a sequence that is opposite or inverse of the fuel adjustments that are provided in the first row of each table.

The first table from the top of FIG. 4 (450) shows air-fuel control sequences when evaluating cylinder numbers one and six for imbalance. The sequence of table 450 may be executed before or after the sequences of tables 452, 454, and 456 are executed to diagnose the presence or absence of imbalance in cylinders numbered two, three, four, five, seven, and eight. In first row 404 of table 450, cylinder number one is operated with a leaner mixture (e.g., 16.6:1) and cylinder number six is operated with a richer mixture (e.g., 12.6:1). Cylinders two, three, and four are operated with slightly richer mixtures (e.g., 13.93:1) and cylinders five, seven. and eight may are operated with slightly leaner mixtures (e.g., 15.27:1) so that the overall engine air to fuel ratio over an engine cycle is stoichiometric. Row two 406 of table 450 shows an inverse air to fuel control sequence as compared to row one 404 of table 450.

The second table from the top of FIG. 4 (452) shows air-fuel control sequences when evaluating cylinder numbers two and eight for imbalance. The sequence of table 452 may be executed before or after the sequences of tables 450, 454, and 456 are executed to diagnose the presence or absence of imbalance in cylinders numbered one, six, three, five, four, and seven. In first row 410 of table 452, cylinder number eight is operated with a leaner mixture (e.g., 16.6:1) and cylinder number two is operated with a richer mixture (e.g., 12.6:1). Cylinders one, three, and four are operated with slightly leaner mixtures (e.g., 15.27:1) and cylinders five, six, and seven may are operated with slightly richer mixtures (e.g., 13.93:1) so that the overall engine air to fuel ratio over an engine cycle is stoichiometric. Row two 412 of table 452 shows an inverse air to fuel control sequence as compared to row one 410 of table 452.

The third table from the top of FIG. 4 (454) shows air-fuel control sequences when evaluating cylinder numbers five and three for imbalance. The sequence of table 454 may be executed before or after the sequences of tables 450, 452, and 456 are executed to diagnose the presence or absence of imbalance in cylinders numbered one, two, six, four, seven, and eight. In first row 416 of table 454, cylinder number five is operated with a leaner mixture (e.g., 16.6:1) and cylinder number three is operated with a richer mixture (e.g., 12.6:1). Cylinders one, two, and four are operated with slightly leaner mixtures (e.g., 15.27:1) and cylinders six, seven, and eight may are operated with slightly richer mixtures (e.g., 13.93:1) so that the overall engine air to fuel ratio over an engine cycle is stoichiometric. Row two 418 of table 454 shows an inverse air to fuel control sequence as compared to row one 416 of table 454.

The fourth table from the top of FIG. 4 (456) shows air-fuel control sequences when evaluating cylinder numbers four and seven for imbalance. The sequence of table 456 may be executed before or after the sequences of tables 450, 452, and 454 are executed to diagnose the presence or absence of imbalance in cylinders numbered one, two, three, five, six, and eight. In first row 422 of table 456, cylinder number seven is operated with a leaner mixture (e.g., 16.6:1) and cylinder number four is operated with a richer mixture (e.g., 12.6:1). Cylinders one, two, and three are operated with slightly leaner mixtures (e.g., 15.27:1) and cylinders five, six, and eight may are operated with slightly richer mixtures (e.g., 13.93:1) so that the overall engine air to fuel ratio over an engine cycle is stoichiometric. Row two 424 of table 456 shows an inverse air to fuel control sequence as compared to row one 422 of table 456.

The sequences of FIG. 4 provide for the engine operating with an overall stoichiometric air to fuel ratio over each engine cycle (e.g., two revolutions for a four-stroke engine). Further, the sequences of FIG. 4 provide air-fuel ratio patterns of ↓⇑↑ for when cylinders three and five are being evaluated for imbalance, where ⇑ indicates air-fuel ratio adjustment from stoichiometry for the cylinder being evaluated for imbalance, where ↓ indicates air-fuel adjustment from stoichiometry for the cylinder that immediately precedes the cylinder being evaluated for imbalance according to the firing order of the engine, and where ↑ indicates the air-fuel adjustment from stoichiometry for the cylinder that immediately follows the cylinder being evaluated for imbalance according to the firing order of the engine. The sequence of FIG. 4 also provides air-fuel ratio patterns of ↑⇑↓ for when cylinders one and six are being evaluated for imbalance and ↑⇑↑ for when cylinders two, four, seven, and eight are being evaluated for imbalance. Additionally, the inverse of these air-fuel ratio patterns may be applied for evaluating imbalance and these air-fuel ratio patterns do not include where large air-fuel ratio adjustments are supplied to cylinders that are adjacent in the engine's firing order (e.g., no ↑⇓⇑). The first sequence shown in two examples in FIGS. 3 and 4 includes two larger air to fuel ratio shifts as indicated by ⇓ and It that are separated by at least one hundred and eighty crankshaft degrees. This reduces a possibility of torque generated by one cylinder from being interpreted as torque generated via a cylinder that is being evaluated for imbalance. Further, the approaches shown in FIGS. 3 and 4 may reduce noise and vibration of the engine by separating larger torque pulses of cylinders being evaluated for imbalance.

Figure 5:
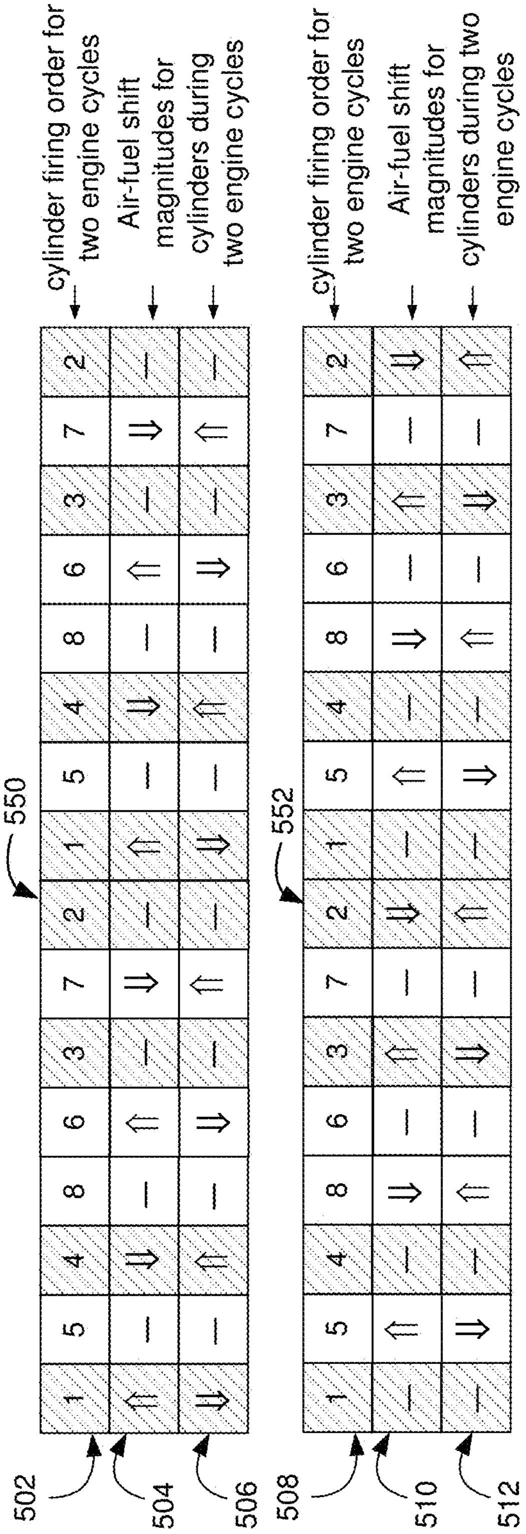

Referring now to FIG. 5, example tables showing a second approach to modulate air to fuel ratios of engine cylinders during cycles of a V-eight four-stroke engine are shown. FIG. 5 includes two tables 550-552. These tables indicate cylinders according to the firing or combustion order of the engine, a V-eight with a firing order of 1-5-4-8-6-3-7-2 in this example. Further, cylinders associated with a first cylinder bank (e.g., cylinders 1-4) include a cross-hatched background and cylinders associated with a second cylinder bank (e.g., cylinders 5-8) include an open or non-cross-hatched background. Tables 550-552 show air to fuel ratio adjustments for two engine cycles. Zeroth rows 502 and 508 indicate firing order of the engine. The air to fuel ratio adjustments or shifts are shown in the first and second rows of each table (504, 506, 510, and 512). The first row of each table represents a fuel adjustment sequence for evaluating two pairs of engine cylinders for imbalance. The second row of each table shows a sequence that is opposite or inverse of the fuel adjustments that are provided in the first row of each table.

The first table from the top of FIG. 5 (550) shows air-fuel control sequences when evaluating cylinder numbers one, four, six, and seven for imbalance. The sequence of table 550 may be executed before or after the sequences of table 552 is executed to diagnose the presence or absence of imbalance in cylinders numbered five, eight, three, and two. In first row 504 of table 550, cylinder number one is operated with a leaner mixture (e.g., 16.6:1), cylinder number four is operated with a richer mixture (e.g., 12.6:1), cylinder number six is operated with a leaner mixture, and cylinder number seven is operated with a richer mixture. The dash (-) in tables 550 and 552 indicates cylinders that are operated with stoichiometric or substantially stoichiometric air to fuel ratios (e.g., vary by less than ±2% of reading). In particular, the air-fuel control sequence of table 550 shows cylinders five, eight, three, and two operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 506 of table 550 shows an inverse air to fuel control sequence as compared to row one 504 of table 550. As previously mentioned, cylinders with wide arrow shafts (e.g., 1) are cylinders that are being evaluated for imbalance.

The second table from the top of FIG. 5 (552) shows air-fuel control sequences when evaluating cylinder numbers five, eight, three, and two for imbalance. The sequence of table 552 may be executed before or after the sequences of table 550 is executed to diagnose the presence or absence of imbalance in cylinders numbered one, four, six, and seven. In first row 510 of table 552, cylinder number five is operated with a leaner mixture (e.g., 16.6:1), cylinder number eight is operated with a richer mixture (e.g., 12.6:1), cylinder number three is operated with a leaner mixture, and cylinder number two is operated with a richer mixture. The air-fuel control sequence of table 552 shows cylinders one, four, six, and seven operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 512 of table 552 shows an inverse air to fuel control sequence as compared to row one 510 of table 552.

The sequence of FIG. 5 provides air-fuel ratio patterns of -⇑ - or -⇓ - for when cylinders one, four, six, and seven are being evaluated for imbalance and similar patterns for when cylinders five, eight, three, and two are being evaluated for imbalance.

The sequences of FIG. 5 provide for the engine operating with an overall stoichiometric air to fuel ratio over each engine cycle (e.g., two revolutions for a four-stroke engine). The first sequence shown in two examples in FIG. 5 includes two larger air to fuel ratio shifts as indicated by ⇓ and ⇑ that are separated by at least one hundred and eighty crankshaft degrees. This reduces a possibility of torque generated by one cylinder from being interpreted as torque generated via a cylinder that is being evaluated for imbalance. Further, the approaches shown in FIG. 5 may reduce noise and vibration of the engine by separating larger torque pulses of cylinders being evaluated for imbalance.

Figure 6:
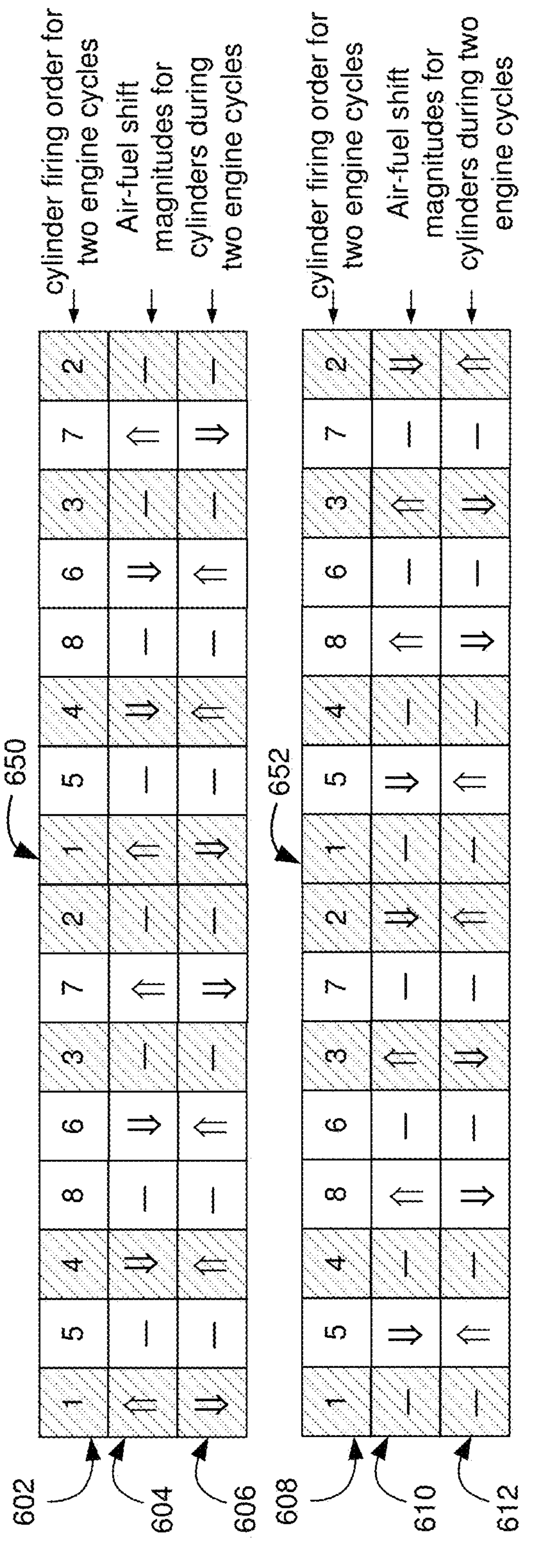

Turning now to FIG. 6, an alternative version of the second air-fuel ratio adjustment approach is shown for the engine having a firing order of 1-5-4-8-6-3-7-2. This alternative version is achieved using same air fuel adjustments for a first bank and inverse fuel adjustments for a second bank compared to the original version of the second air-fuel ratio adjustment approach.

The first table from the top of FIG. 6 (650) shows air-fuel control sequences when evaluating cylinder numbers one, four, six, and seven for imbalance. The sequence of table 650 may be executed before or after the sequences of table 652 is executed to diagnose the presence or absence of imbalance in cylinders numbered five, eight, three, and two. In first row 604 of table 650, cylinder number one is operated with a leaner mixture (e.g., 16.6:1), cylinder number four is operated with a richer mixture (e.g., 12.6:1), cylinder number six is operated with a richer mixture, and cylinder number seven is operated with a leaner mixture. The dash (-) in tables 650 and 652 indicates cylinders that are operated with stoichiometric or substantially stoichiometric air to fuel ratios (e.g., vary by less than ±2% of reading). In particular, the air-fuel control sequence of table 650 shows cylinders five, eight, three, and two operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 606 of table 650 shows an inverse air to fuel control sequence as compared to row one 604 of table 650. As previously mentioned, cylinders with wide arrow shafts (e.g., ⇑ ) are cylinders that are being evaluated for imbalance.

The second table from the top of FIG. 6 (652) shows air-fuel control sequences when evaluating cylinder numbers five, eight, three, and two for imbalance. The sequence of table 652 may be executed before or after the sequences of table 650 is executed to diagnose the presence or absence of imbalance in cylinders numbered one, four, six, and seven. In first row 610 of table 652, cylinder number five is operated with a richer mixture (e.g., 12.6:1), cylinder number eight is operated with a leaner mixture (e.g., 16.6:1), cylinder number three is operated with a leaner mixture, and cylinder number two is operated with a richer mixture. The air-fuel control sequence of table 652 shows cylinders one, four, six, and seven operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 612 of table 652 shows an inverse air to fuel control sequence as compared to row one 610 of table 652.

The sequence of FIG. 6 provides air-fuel ratio patterns of -⇑ - or -⇓ - for when cylinders one, four, six, and seven are being evaluated for imbalance and similar patterns for when cylinders five, eight, three, and two are being evaluated for imbalance.

The sequences of FIG. 6 provide for the engine operating with an overall stoichiometric air to fuel ratio over each engine cycle (e.g., two revolutions for a four-stroke engine). The first sequence shown in two examples in FIG. 6 includes two larger air to fuel ratio shifts as indicated by U and Ir that are separated by at least one hundred and eighty crankshaft degrees. This reduces a possibility of torque generated by one cylinder from being interpreted as torque generated via a cylinder that is being evaluated for imbalance. Further, the approaches shown in FIG. 6 may reduce noise and vibration of the engine by separating larger torque pulses of cylinders being evaluated for imbalance.

Figure 7:
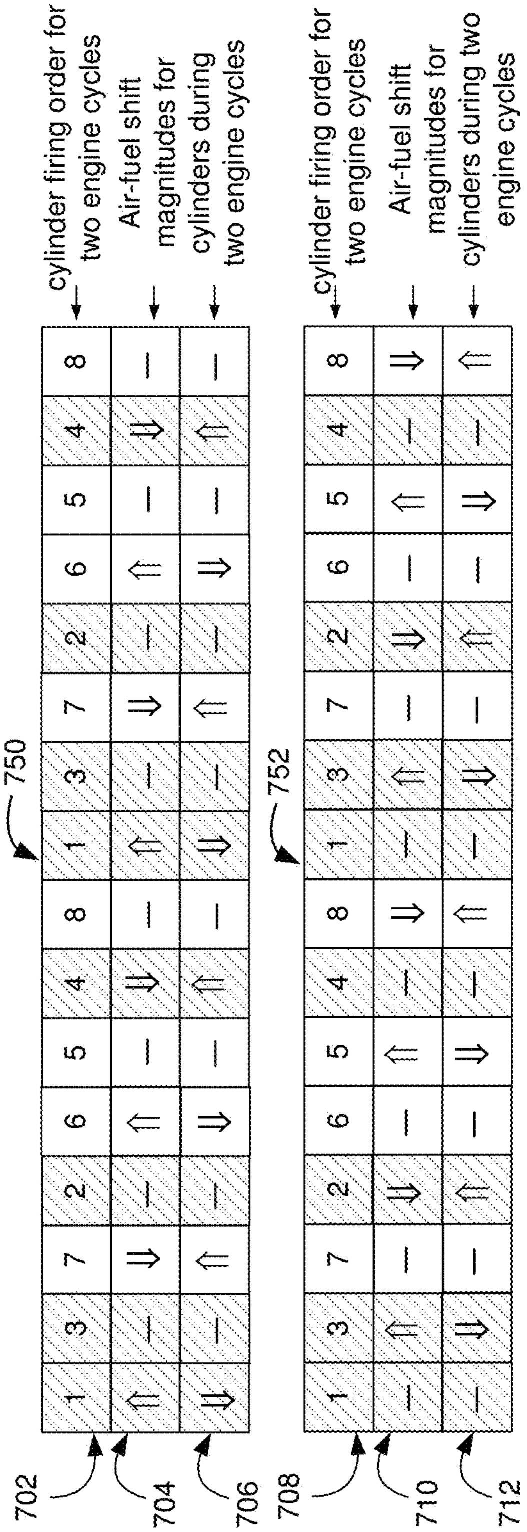

Turning now to FIG. 7, example tables showing a second approach to modulate air to fuel ratios of engine cylinders during cycles of a second V-eight four-stroke engine are shown. FIG. 7 includes two tables 750-752. These tables indicate cylinders according to the firing or combustion order of the engine, a V-eight with a firing order of 1-3-7-2-6-5-4-8 in this example. Further, cylinders associated with a first cylinder bank (e.g., cylinders 1-4) include a cross-hatched background and cylinders associated with a second cylinder bank (e.g., cylinders 5-8) include an open or non-cross-hatched background. Tables 750-752 show air to fuel ratio adjustments for two engine cycles. Zeroth rows 702 and 708 indicate firing order of the engine. The air to fuel ratio adjustments or shifts are shown in the first and second rows of each table (704, 706, 710, and 712). The first row of each table represents a fuel adjustment sequence for evaluating two pair of engine cylinders for imbalance. The second row of each table shows a sequence that is opposite or inverse of the fuel adjustments that are provided in the first row of each table.

The first table from the top of FIG. 7 (750) shows air-fuel control sequences when evaluating cylinder numbers one, seven, six, and four for imbalance. The sequence of table 750 may be executed before or after the sequences of table 752 is executed to diagnose the presence or absence of imbalance in cylinders numbered five, eight, three, and two. In first row 704 of table 750, cylinder number one is operated with a leaner mixture (e.g., 16.6:1), cylinder number four is operated with a richer mixture (e.g., 12.6:1), cylinder number six is operated with a leaner mixture, and cylinder number seven is operated with a richer mixture. The dash (-) in tables 750 and 752 indicates cylinders that are operated with stoichiometric or substantially stoichiometric air to fuel ratios (e.g., vary by less than ±2% of reading). In particular, the air-fuel control sequence of table 750 shows cylinders five, eight, three, and two operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 706 of table 750 shows an inverse air to fuel control sequence as compared to row one 704 of table 750. As previously mentioned, cylinders with wide arrow shafts (e.g., ⇑ ) are cylinders that are being evaluated for imbalance.

The second table from the top of FIG. 7 (752) shows air-fuel control sequences when evaluating cylinder numbers five, eight, three, and two for imbalance. The sequence of table 752 may be executed before or after the sequences of table 750 is executed to diagnose the presence or absence of imbalance in cylinders numbered one, four, six, and seven. In first row 710 of table 752, cylinder number five is operated with a leaner mixture (e.g., 16.6:1), cylinder number eight is operated with a richer mixture (e.g., 12.6:1), cylinder number three is operated with a leaner mixture, and cylinder number two is operated with a richer mixture. The air-fuel control sequence of table 752 shows cylinders one, four, six, and seven operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 712 of table 752 shows an inverse air to fuel control sequence as compared to row one 710 of table 752.

The sequence of FIG. 7 provides air-fuel ratio patterns of -⇑ - or -⇓ - for when cylinders one, four, six, and seven are being evaluated for imbalance and similar patterns for when cylinders five, eight, three, and two are being evaluated for imbalance.

The sequences of FIG. 7 provide for the engine operating with an overall stoichiometric air to fuel ratio over each engine cycle (e.g., two revolutions for a four-stroke engine). The first sequence shown in two examples in FIG. 7 includes two larger air to fuel ratio shifts as indicated by ⇓ and ⇑ that are separated by at least one hundred and eighty crankshaft degrees. This reduces a possibility of torque generated by one cylinder from being interpreted as torque generated via a cylinder that is being evaluated for imbalance. Further, the approaches shown in FIG. 7 may reduce noise and vibration of the engine by separating larger torque pulses of cylinders being evaluated for imbalance.

Figure 8:
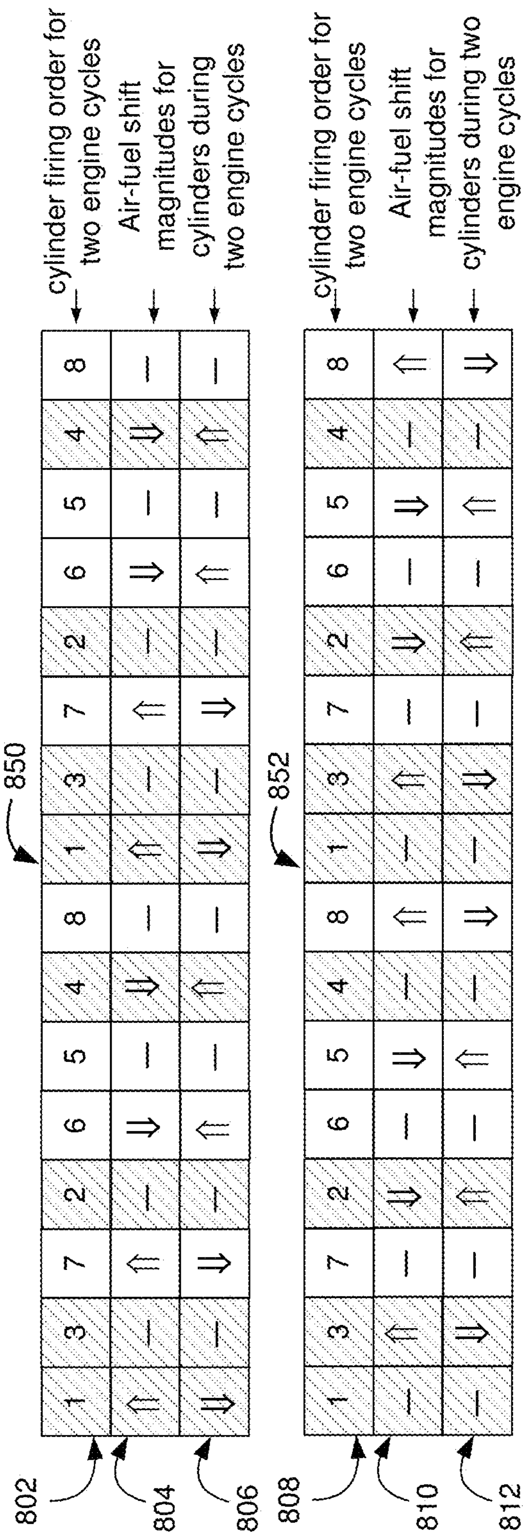

Turning now to FIG. 8, an alternative version of the second air-fuel ratio adjustment approach is shown for the engine having a firing order of 1-3-7-2-6-5-4-8. The first table from the top of FIG. 8 (850) shows air-fuel control sequences when evaluating cylinder numbers one, seven, six, and four for imbalance. The sequence of table 850 may be executed before or after the sequences of table 852 is executed to diagnose the presence or absence of imbalance in cylinders numbered five, eight, three, and two. In first row 804 of table 850, cylinder number one is operated with a leaner mixture (e.g., 16.6:1). cylinder number four is operated with a richer mixture (e.g., 12.6:1), cylinder number six is operated with a richer mixture, and cylinder number seven is operated with a leaner mixture. The dash (-) in tables 850 and 852 indicates cylinders that are operated with stoichiometric or substantially stoichiometric air to fuel ratios (e.g., vary by less than ±2% of reading). In particular, the air-fuel control sequence of table 850 shows cylinders five, eight, three, and two operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 806 of table 850 shows an inverse air to fuel control sequence as compared to row one 804 of table 850. As previously mentioned, cylinders with wide arrow shafts (e.g., ⇑) are cylinders that are being evaluated for imbalance.

The second table from the top of FIG. 8 (852) shows air-fuel control sequences when evaluating cylinder numbers five, eight, three, and two for imbalance. The sequence of table 852 may be executed before or after the sequences of table 850 is executed to diagnose the presence or absence of imbalance in cylinders numbered one, four, six, and seven. In first row 810 of table 852, cylinder number five is operated with a richer mixture (e.g., 12.6:1), cylinder number eight is operated with a leaner mixture (e.g., 16.6:1), cylinder number three is operated with a leaner mixture, and cylinder number two is operated with a richer mixture. The air-fuel control sequence of table 852 shows cylinders one, four, six, and seven operating with a stoichiometric air to fuel ratio. In this example, two cylinders of a same cylinder bank are operated with air-fuel adjustments in two different directions, namely one lean and one rich. This allows the overall air to fuel ratio of the engine cylinder bank to be stoichiometric even though air-fuel ratios of two cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Row two 812 of table 852 shows an inverse air to fuel control sequence as compared to row one 810 of table 852.

The sequence of FIG. 8 provides air-fuel ratio patterns of -⇑ - or -⇓ - for when cylinders one, four, six, and seven are being evaluated for imbalance and similar patterns for when cylinders five, eight, three, and two are being evaluated for imbalance.

The sequences of FIG. 8 provide for the engine operating with an overall stoichiometric air to fuel ratio over each engine cycle (e.g., two revolutions for a four-stroke engine). The first sequence shown in two examples in FIG. 8 includes two larger air to fuel ratio shifts as indicated by ⇓ and ⇑ that are separated by at least one hundred and eighty crankshaft degrees. This reduces a possibility of torque generated by one cylinder from being interpreted as torque generated via a cylinder that is being evaluated for imbalance. Further, the approaches shown in FIG. 8 may reduce noise and vibration of the engine by separating larger torque pulses of cylinders being evaluated for imbalance.

Turning now to FIG. 9, an alternative version of the second air-fuel ratio adjustment approach is shown for a V-six engine having a firing order of 1-4-2-5-3-6. The first table from the top of FIG. 9 (950) shows air-fuel control sequences when evaluating cylinder numbers one, two, and three for imbalance. The sequence of table 950 may be executed before or after the sequences of table 952 is executed to diagnose the presence or absence of imbalance in cylinders numbered four, five, and six. In first row 904 of table 950, cylinder number one is operated with a leaner mixture (e.g., 16.6:1). cylinder number two is operated with a richer mixture (e.g., 12.6:1), and cylinder number three is operated with a leaner mixture in a first cycle of the engine and cylinder number one is operated with a richer mixture (e.g., 12.6:1). cylinder number two is operated with a leaner mixture (e.g., 16.6:1), and cylinder number three is operated with a richer mixture in a second cycle of the engine. The dash (-) in tables 950 and 952 indicates cylinders that are operated with stoichiometric or substantially stoichiometric air to fuel ratios (e.g., vary by less than ±2% of reading). In particular, the air-fuel control sequence of table 950 shows cylinders five, eight, three, and two operating with a stoichiometric air to fuel ratio. In this example, the air-fuel ratio of every other cylinder that is being evaluated for imbalance is alternated between rich and lean. This allows the overall air to fuel ratio of the engine cylinder bank to be stoichiometric over two engine cycles even though air-fuel ratios of three cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance.

The second table from the top of FIG. 9 (952) shows air-fuel control sequences when evaluating cylinder numbers four, five, and six for imbalance. The sequence of table 952 may be executed before or after the sequences of table 950 is executed to diagnose the presence or absence of imbalance in cylinders numbered one, two, and three. In first row 910 of table 952, cylinder number four is operated with a leaner mixture (e.g., 16.6:1), and cylinder number five is operated with a richer mixture (e.g., 12.6:1), cylinder number six is operated with a leaner mixture during a first engine cycle. However, during a second engine cylinder following the first engine cycle, cylinder number four is operated with a richer mixture, cylinder number five is operated with a leaner mixture, and cylinder number six is operated with a richer mixture. The air-fuel control sequence of table 952 shows cylinders one, two, and three being operating with a stoichiometric air to fuel ratio. In this example, the air-fuel ratio of every other cylinder that is being evaluated for imbalance is alternated between rich and lean. This allows the overall air to fuel ratio of the engine cylinder bank to be stoichiometric over two engine cycles even though air-fuel ratios of three cylinders are moved away from the stoichiometric air to fuel ratio. Additionally, fuel adjustments away from stoichiometry are at least one hundred and eighty crankshaft degrees away from each other so that a torque change of one cylinder being evaluated for imbalance and due to its air to fuel ratio does not affect or has less effect on torque generated by a second cylinder that is being evaluated for imbalance. Zeroth rows 902 of table 950 and zeroth row 906 of table 952 indicate the firing order of the engine.

The sequence of FIG. 9 provides air-fuel ratio patterns of -⇑ - or -⇓ - for when cylinders one, two, and three are being evaluated for imbalance and similar patterns for when cylinders four, five, and six are being evaluated for imbalance.

The sequences of FIG. 9 provide for the engine operating with an overall stoichiometric air to fuel ratio over two engine cycles (e.g., four revolutions for a four-stroke engine). The first sequence shown in two examples in FIG. 9 includes three larger air to fuel ratio shifts spanning two engine cycles as indicated by ⇓ and ⇑ that are separated by at least one hundred and eighty crankshaft degrees. This reduces a possibility of torque generated by one cylinder from being interpreted as torque generated via a cylinder that is being evaluated for imbalance. Further, the approaches shown in FIG. 9 may reduce noise and vibration of the engine by separating larger torque pulses of cylinders being evaluated for imbalance.

Moving on to FIG. 10, three tables 1050, 1052, and 1054 show air-fuel sequences for evaluating different cylinders for imbalance for a six-cylinder engine having a firing order of 1-4-2-5-3-6.

The first table 1050 from the top of FIG. 10 includes a zeroth row 1002 that includes cylinder numbers that are arranged in the firing order of the engine. The first row 1004 includes wide shaft arrows that indicate which engine cylinder is being evaluated for imbalance and which way the air-fuel ratio of the cylinder that being evaluate for imbalance is adjusted. In first table 1050, cylinder numbers one and five are being evaluated for imbalance. During the first two engine cycles reading table 1050 from left to right, cylinder number one is adjusted lean and then it is adjusted rich one engine cycle later. Cylinder number five is adjusted rich during the first engine cycle and then it is adjusted lean during the second engine cycle. Cylinder numbers four, two, three, and six are operate with stoichiometric air to fuel ratios. This sequence allows the engine to operate with an overall stoichiometric air fuel ratio over two adjacent engine cycles.

The second table 1052 from the top of FIG. 10 includes a zeroth row 1006 that includes cylinder numbers that are arranged in the firing order of the engine. The first row 1008 includes wide shaft arrows that indicate which engine cylinder is being evaluated for imbalance and which way the air-fuel ratio of the cylinder that being evaluate for imbalance is adjusted. In second table 1052, cylinder numbers two and six are being evaluated for imbalance. During the first two engine cycles reading table 1052 from left to right, cylinder number two is adjusted lean and then it is adjusted rich one engine cycle later. Cylinder number six is adjusted rich during the first engine cycle and then it is adjusted lean during the second engine cycle. Cylinder numbers one, four, five, and three are operate with stoichiometric air to fuel ratios. This sequence allows the engine to operate with an overall stoichiometric air fuel ratio over two adjacent engine cycles.

The third table 1054 from the top of FIG. 10 includes a zeroth row 1010 that includes cylinder numbers that are arranged in the firing order of the engine. The first row 1012 includes wide shaft arrows that indicate which engine cylinder is being evaluated for imbalance and which way the air-fuel ratio of the cylinder that being evaluate for imbalance is adjusted. In third table 1054, cylinder numbers four and three are being evaluated for imbalance. During the first two engine cycles reading table 1054 from left to right, cylinder number four is adjusted lean and then it is adjusted rich one engine cycle later. Cylinder number three is adjusted lean during the first engine cycle and then it is adjusted rich during the second engine cycle. Cylinder numbers one, two, five, and six are operate with stoichiometric air to fuel ratios. This sequence allows the engine to operate with an overall stoichiometric air fuel ratio over two adjacent engine cycles.

The system of FIGS. 1 and 2 may include executable instructions to generate the air-fuel control sequences that are shown in FIGS. 3-10 via adjusting fuel that is injected to one or more cylinders. The sequences may be stored as executable instructions in non-transitory method. A controller in the system may execute the instructions to adjust injectors in the real-world to achieve the illustrated air-fuel control sequences.

Thus, the system of FIGS. 1-10 provides for an engine system, comprising: an internal combustion engine comprising a first bank of cylinders and a second bank of cylinders; and a controller including executable instructions stored in non-transitory memory that cause the controller to operate the internal combustion engine over a plurality of engine cycles in response to an engine cylinder imbalance diagnostic request such that each engine cylinder is evaluated for imbalance, and during each engine cycle, there are at least two cylinders being evaluated for imbalance, and where there are at least one hundred and eighty crankshaft degrees between cylinders the at least two cylinders being evaluated for imbalance. In a first example, the system includes where a first of the at least two cylinders being evaluated for imbalance is operated with a rich air to fuel ratio. In a second example that may include the first example, the system includes where a second of the at least two cylinders being evaluated for imbalance is operated with a lean air to fuel ratio. In a third example that may include one or both of the first and second examples, the system includes where the at least two cylinders being evaluated for imbalance includes four cylinders being evaluated for imbalance. In a fourth example that may include one or more of the first through third examples, the system includes where every other cylinder in a combustion order of the internal combustion engine is evaluated for imbalance during each engine cycle. In a fifth example that may include one or more of the first through fourth examples, the system further comprises operating the internal combustion engine with an average air to fuel ratio combusted by the first bank of cylinders being stoichiometric and an average air to fuel ratio combusted by the second bank of cylinders being stoichiometric.

Referring now to FIG. 11, a method 1100 for operating an engine and monitoring cylinder imbalance is shown. The method of FIG. 11 may be incorporated into the system of FIGS. 1 and 2 as executable instructions stored in non-transitory memory. The method of FIG. 11 may cause the controller shown in FIG. 1 to receive inputs from one or more sensors described herein and adjust positions or operating states of one or more actuators described herein in the physical world.

At 1102, method 1100 judges whether or not a cylinder air-fuel ratio imbalance diagnostic is requested. A cylinder imbalance diagnostic may be requested via a user (human input), a test system input (e.g., end of assembly input), or after prescribed vehicle conditions are met (e.g., the engine has been activated for a cumulative time period). If method 1100 judges that a cylinder air-fuel ratio imbalance diagnostic has been requested, the answer is yes and method 1100 proceeds to 1104. Otherwise, the answer is no and method 1100 proceeds to exit.

At 1104, method 1100 selects air-fuel modulation method one and one of the sequences shown in FIGS. 3 and 4 or method two and one of the sequences shown in FIGS. 5-10. Method 1100 may make the selection according to the engine configuration and firing order or via known performance metrics for the first and second methods. Method 1100 proceeds to 1106.

At 1106, method 1100 modulates the engine's cylinder air-fuel ratios according to the method and sequence selected at 1104. Method 1100 may modulate air-fuel ratios of engine cylinders by adjusting the amount of fuel that is injected to the cylinders. Method 1100 proceeds to 1108.

At 1108, method 1100 determines a rate of engine speed change for each cylinder. These rates of speed change may be determined during each cylinder's power stroke when the air-fuel mixture in the cylinder is combusted. The rate of engine speed change may be normalized for spark timing and engine ancillary loads. Method 1100 may determine a predetermined number of crankshaft rate of speed changes while air-fuel ratio of the cylinder is modified and method 1100 may retrieve from memory a predetermined number of predetermined crankshaft rate of speed changes. Method 1100 may determine a mean of measured crankshaft rate of speed changes while the air-fuel ratio of the cylinder is modified. Further, method 1100 may determine a mean of the predetermined crankshaft rate of speed changes. Method 1100 may reference a table or function to determine an air-fuel ratio change from a nominal air-fuel ratio (e.g., stoichiometry) according to a difference between the observed crankshaft rate of speed changes during the combustion or power stroke of the cylinder that is being evaluated for imbalance and the predetermined number of predetermined crankshaft rate of speed changes. Method 1100 proceeds to 1110.

At 1110, method 1100 indicates imbalance for the cylinder if the cylinder's inferred air-fuel ratio change exceeds a threshold value. Method 1100 may report the cylinder imbalance to the vehicle user via a human/machine interface. Method 1100 may evaluate each engine cylinder for imbalance via applying the air-fuel ratio control patterns as shown in one of FIGS. 3-10. Method 1100 proceeds to 1112.

At 1112, method 1100 may adjust air-fuel ratios of engine cylinders that are determined to be experiencing imbalance. For example, if method 1100 determines that a cylinder's air-fuel ratio is 0.5 air-fuel ratios lean of a nominal air-fuel ratio, method 1100 may adjust the cylinders air-fuel ratio by richening the air-fuel ratio for the cylinder by 0.5 air-fuel ratios. Thus, method 1100 may drive the cylinder's air-fuel ratio back toward the nominal air-fuel ratio. The nominal air-fuel ratio may be a predetermined air-fuel ratio (e.g., a stoichiometric air-fuel ratio). Method 1100 proceeds to exit.

In this way, an engine's air-fuel ratio may be modified cylinder by cylinder to increase accuracy of inferring air-fuel ratios for the engine's cylinders. The engine air-fuel ratio may be modulated to reduce engine noise and vibration while increasing a signal to noise ratio of the engine's rate of speed change for estimating engine torque and cylinder air-fuel ratio.

Thus, method 1100 provides for a method for operating an engine, comprising: operating the engine over a plurality of engine cycles in response to an engine cylinder imbalance diagnostic request such that during each engine cycle a pair of cylinders is operated with a first cylinder combusting a first ratio of air to fuel and a second cylinder combusting a second ratio of air to fuel, where cylinders other than the first cylinder and the second cylinder are combusting a ratio of air to fuel that is different from the first ratio of air to fuel and the second ratio of air to fuel, where cylinders included in the pair of cylinders vary over the plurality of engine cycles, where each cylinder of the engine is included in the pair of cylinders over the plurality of engine cycles, and where there is at least one hundred and eighty crankshaft degrees between combusting the first ratio of air to fuel and the second ratio of air to fuel during each of the plurality of engine cycles. In a first example, the method includes where the first ratio of air to fuel is lean of a stoichiometric air to fuel ratio, and where the second ratio of air to fuel is rich of the stoichiometric air to fuel ratio. In a second example that may include the first example, the method includes where the cylinders other than the first cylinder and the second cylinder are combusting air to fuel ratios that are between the first ratio of air to fuel and the second ratio of air to fuel. In a third example that may include one or both of the first and second examples, the method includes where a third cylinder that is adjacent to the first cylinder and prior to the first cylinder in an order of combustion of the engine, and where the third cylinder combusts a third ratio of air to fuel that is rich of a stoichiometric ratio of air to fuel. In a fourth example that may include one or more of the first through third examples, the method includes where a fourth cylinder that is adjacent to the first cylinder and subsequent to the first cylinder in the order of combustion of the engine, and where the fourth cylinder combusts a fourth ratio of air to fuel that is lean and richer than the first ratio of air to fuel. In a fifth example that may include one or more of the first through fourth examples, the method includes where a fifth cylinder that is adjacent to the second cylinder and prior to the second cylinder in the order of combustion of the engine, and where the fifth cylinder combusts a fifth ratio of air to fuel is lean. In a sixth example that may include one or more of the first through fifth examples, the method includes where a sixth cylinder that is adjacent to the second cylinder and subsequent to the second cylinder in the order of combustion of the engine, and where the sixth cylinder combusts a sixth air to fuel ratio that is rich and leaner than the second ratio of air to fuel. In a seventh example that may include one or more of the first through six examples, the method includes where the first ratio of air to fuel is rich of a stoichiometric air to fuel ratio, and where the second ratio of air to fuel is lean of the stoichiometric air to fuel ratio. In an eighth example that may include one or more of the first through seventh examples, the method includes where an average air to fuel ratio combusted by each cylinder bank of the engine over an engine cycle of the engine is a stoichiometric air to fuel ratio.

The method of FIG. 11 also provides for a method for operating an engine, comprising: operating the engine over a plurality of engine cycles in response to an engine cylinder imbalance diagnostic request such that during each engine cycle, a group of cylinders equal to half an actual total number of cylinders of the engine are operated rich or lean of a stoichiometric air to fuel ratio and engine cylinders not in the group of cylinders operated at the stoichiometric air to fuel ratio, where each cylinder in the group of cylinders is at least one hundred and eighty crankshaft degrees away from other cylinders in the group of cylinders according to a combustion order of the engine. In a first example, the method includes where the group of cylinders includes cylinders that are operated rich of the stoichiometric ratio of air to fuel and cylinders that are operated lean of the stoichiometric ratio of air to fuel during the plurality of engine cycles. In a second example that may include the first example, the method includes where during each engine cycle each engine cylinder bank is operated with an average air to fuel ratio equal to the stoichiometric ratio of air to fuel. In a third example that may include one or both of the first and second examples, the method includes where during each engine cycle each engine cylinder bank is not operated with an average air to fuel ratio equal to the stoichiometric ratio of air to fuel, and where during each two engine cycles, engine cylinder bank is operated with the average air to fuel ratio equal to the stoichiometric ratio of air to fuel. In a fourth example that may include one or more of the first through third examples, the method includes where a first half of cylinders in the group of cylinders operate rich and a second half of cylinders in the group of cylinders operate lean.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
operating the engine over a plurality of engine cycles in response to an engine cylinder imbalance diagnostic request such that during each engine cycle a pair of cylinders is operated with a first cylinder combusting a first ratio of air to fuel and a second cylinder combusting a second ratio of air to fuel, where cylinders other than the first cylinder and the second cylinder are combusting a ratio of air to fuel that is different from the first ratio of air to fuel and the second ratio of air to fuel, where cylinders included in the pair of cylinders vary over the plurality of engine cycles, where each cylinder of the engine is included in the pair of cylinders over the plurality of engine cycles, and where there is at least one hundred and eighty crankshaft degrees between combusting the first ratio of air to fuel and the second ratio of air to fuel during each of the plurality of engine cycles.

2. The method of claim 1, where the first ratio of air to fuel is lean of a stoichiometric air to fuel ratio, and where the second ratio of air to fuel is rich of the stoichiometric air to fuel ratio.

3. The method of claim 2, where the cylinders other than the first cylinder and the second cylinder are combusting air to fuel ratios that are between the first ratio of air to fuel and the second ratio of air to fuel.

4. The method of claim 1, where a third cylinder that is adjacent to the first cylinder and prior to the first cylinder in an order of combustion of the engine, and where the third cylinder combusts a third ratio of air to fuel that is rich of a stoichiometric ratio of air to fuel.

5. The method of claim 4, where a fourth cylinder that is adjacent to the first cylinder and subsequent to the first cylinder in the order of combustion of the engine, and where the fourth cylinder combusts a fourth ratio of air to fuel that is lean and richer than the first ratio of air to fuel.

6. The method of claim 5, where a fifth cylinder that is adjacent to the second cylinder and prior to the second cylinder in the order of combustion of the engine, and where the fifth cylinder combusts a fifth ratio of air to fuel is lean.

7. The method of claim 6, where a sixth cylinder that is adjacent to the second cylinder and subsequent to the second cylinder in the order of combustion of the engine, and where the sixth cylinder combusts a sixth air to fuel ratio that is rich and leaner than the second ratio of air to fuel.

8. The method of claim 1, where the first ratio of air to fuel is rich of a stoichiometric air to fuel ratio, and where the second ratio of air to fuel is lean of the stoichiometric air to fuel ratio.

9. The method of claim 1, where an average air to fuel ratio combusted by each cylinder bank of the engine over an engine cycle of the engine is a stoichiometric air to fuel ratio.

10. A method for operating an engine, comprising:
operating the engine over a plurality of engine cycles in response to an engine cylinder imbalance diagnostic request such that during each engine cycle, a group of cylinders equal to half an actual total number of cylinders of the engine are operated rich or lean of a stoichiometric air to fuel ratio and engine cylinders not in the group of cylinders operated at the stoichiometric air to fuel ratio, where each cylinder in the group of cylinders is at least one hundred and eighty crankshaft degrees away from other cylinders in the group of cylinders according to a combustion order of the engine.

11. The method of claim 10, where the group of cylinders includes cylinders that are operated rich of the stoichiometric ratio of air to fuel and cylinders that are operated lean of the stoichiometric ratio of air to fuel during the plurality of engine cycles.

12. The method of claim 11, where during each engine cycle each engine cylinder bank is operated with an average air to fuel ratio equal to the stoichiometric ratio of air to fuel.

13. The method of claim 11, where during each engine cycle each engine cylinder bank is not operated with an average air to fuel ratio equal to the stoichiometric ratio of air to fuel, and where during each two engine cycles, engine cylinder bank is operated with the average air to fuel ratio equal to the stoichiometric ratio of air to fuel.

14. The method of claim 10, where a first half of cylinders in the group of cylinders operate rich and a second half of cylinders in the group of cylinders operate lean.

* * * * *